I. GOLDKIND.
INCANDESCENT ELECTRIC LAMP SOCKET.
No. 11,341. Reissued May 23, 1893.
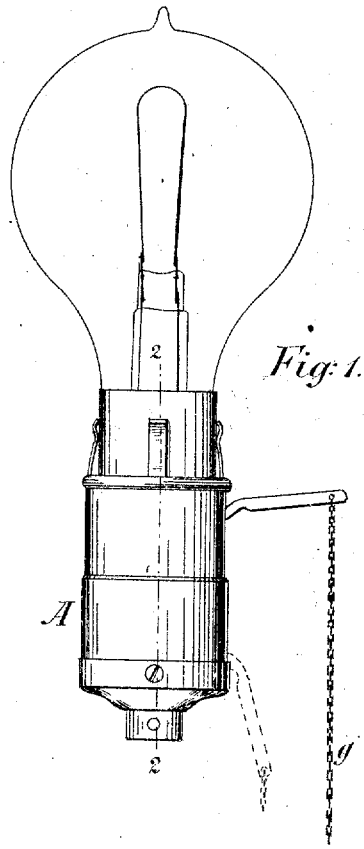
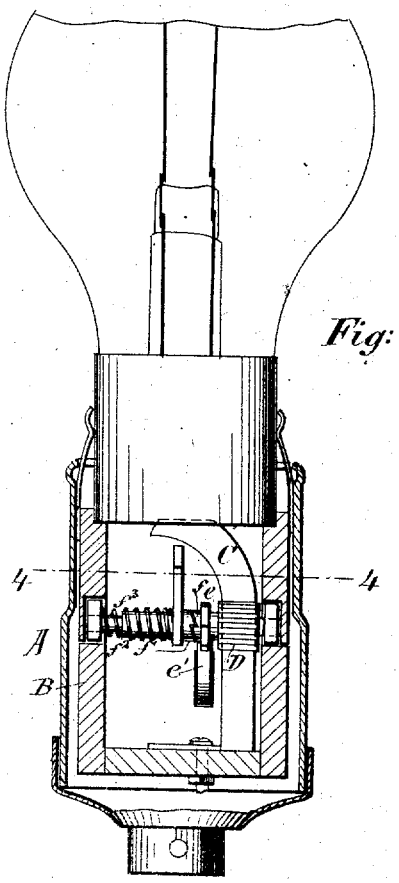
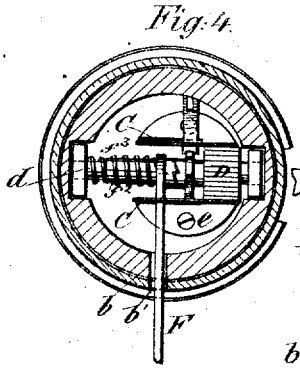
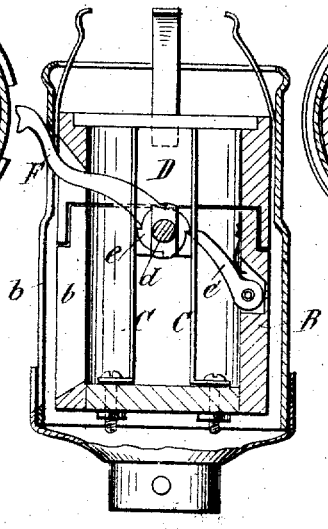
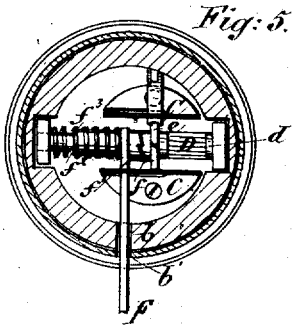
WITNESSES:
Marion Hall
Charles Schroeder
INVENTOR
I. Goldkind
BY Geipel & Kiegener
ATTORNEYS.

UNITED STATES PATENT OFFICE.

ISAAC GOLDKIND, OF NEW YORK, N. Y., ASSIGNOR TO LOUIS STIRN AND JULIUS SOMBORN, OF SAME PLACE.

INCANDESCENT-ELECTRIC-LAMP SOCKET.

SPECIFICATION forming part of Reissued Letters Patent No. 11,341, dated May 23, 1893.

Original No. 479,359, dated July 19, 1892. Application for reissue filed November 22, 1892. Serial No. 452,848.

*To all whom it may concern:*

Be it known that I, ISAAC GOLDKIND, a subject of the Emperor of Russia, residing in the city of New York, in the county of New York and State of New York, have invented certain new and useful Improvements in Incandescent-Lamp Sockets; and I do hereby declare the following is a full, clear, and exact description thereof.

This invention relates to that class of sockets for incandescent electric-lamps in which a switch is arranged for controlling the current, which switch is operated by the oscillating motion of a lever that is so arranged as to alternately throw the lamp in or out of circuit so that the lamp can be readily lighted or extinguished, even when the same is in a position so that it can not be reached easily and in which the keys or other switch-operating devices are inconveniently applied.

In the accompanying drawings, Figure 1 represents a side elevation of my improved socket for incandescent lamps. Fig. 2 is a vertical transverse section of the same on line 2 2, Fig. 1, on an enlarged scale. Fig. 3 is also a transverse section of the same taken on a plane at right angles to that on which Fig. 2 is taken; and Figs. 4 and 5 are horizontal sections on line 4 4, Fig. 2, showing the lamp respectively switched in and out of circuit.

Similar letters of reference indicate corresponding parts.

Referring to the drawings, A represents the exterior holder or shell of my improved incandescent lamp socket. In the interior of the same is arranged a cylindrical socket B of hard rubber or other suitable insulating material, to the base of which are attached two contact-springs C, which extend parallel with each other up through the socket B, and which are connected with the conducting-wires. The opposite ends of the contact springs C form metallic contact with the conducting-pieces at the lower part or base of the incandescent lamp that is inserted into the socket B. When the contact-springs are spread apart, the contact with the conducting pieces is interrupted, which when the pressure on the contact-springs is released, the same are returned by their own spring-action into normal position. The spreading or releasing of the contact-springs C is produced by means of an oblong block D, which is attached to a spindle or shaft $d$, that is supported in suitable bearings of the socket B. To the spindle $d$ is applied a ratchet-wheel $e$, which is provided with four teeth, said ratchet-wheel being engaged by a spring-actuated check-pawl $e'$ that is pivoted to the interior of the socket B, as shown clearly in Fig. 3.

At one side of the ratchet-wheel $e$ is arranged one member $f$ of a clutch, which is also provided with four teeth, which are in line with the teeth of the ratchet-wheel $e$, and which mesh with a second member $f'$ of the clutch, which member is also provided with four teeth, and which is arranged on the end of a sleeve $f^2$, that is mounted loosely on the spindle $d$ and provided with a fixed lever F that extends through a longitudinal slot $b\,b'$ in the socket and holder to the outside of the same. A helical spring $f^3$ is placed around the sleeve $f^2$ and attached at one end to the lever F and at the opposite end to the fixed bearing of the spindle $d$, said spring exerting not only a spring action on the lever F so as to return the same into its normal position after the same has been pulled in opposite direction to the tension of the spring $f^3$, but which also exerts a lateral pressure on the sleeve $f^2$ so as to retain the members $f\,f'$ of the clutch in mesh with each other. The spring has thus two functions, firstly, the returning of the lever F, and, secondly, the interlocking of the members of the clutch-device $f\,f'$. To the outer end of the lever F is attached a chain, cord or other suitable device $g$ by which the same can be pulled in downward direction until it arrives at the ends of the slots $b\,b'$, as shown in dotted lines in Fig. 1. By thus swinging the lever F for a distance about equal to the length of a quadrant of a circle, the sleeve $f^2$ and the spindle $d$, to which the sleeve $f^2$ is connected, by the clutch $f\,f'$ are also moved through a quadrant of a circle, so that the ratchet-wheel $e$ is turned for the distance of one tooth and likewise the oblong block D is moved through an angle of ninety degrees. As soon as the downward motion on the lever is released, it is returned by the spring $f^2$ into its normal position again, during which motion the sleeve $f^2$ "gives" sufficiently in a lateral direction, so that the spring-actuated member $f'$ of the clutch can pass over the member $f$ that is applied to the spindle $d$. The check-pawl $e'$ prevents the spindle $d$ from following the motion of the sleeve $f^2$ during the return-motion of the lever F. It thus appears that the spindle $d$ and oblong block D are moved at every downward motion of the lever F through a quadrant of a circle, so that the oblong block D alternately makes contact with the springs so as to bring the lamp into circuit, or breaks contact and assumes a position parallel with the contact-springs, so that they return to their normal position and throw the lamp out of circuit, as no current can then pass to the lamp. During the return motion of the lever, the position of the block D is not disturbed, nor is the position of the springs disturbed, as the check-pawl $e'$ prevents the turning of the spindle $d$ and of the block D during the return movement of the lever F. The lamp is therefore switched in, by one downward motion of the lever, while the next downward motion of the lever switches the same out of circuit.

The throwing in or out of circuit of the lamp by the oscillating motion of the lever F has the advantage that the switch-mechanism can be used with lamps, which are not convenient of access, as it is not necessary to get up to the lamp for turning a key or other switch-device. Access is thereby given to any lamp, whatever its position, and the very convenient and reliable switching in and out of the same produced. In case the lamp is to be supported in inverted position in the holder, the entire switching-mechanism must be reversed so that it can be operated in the same manner by merely pulling the chain or cord.

Having thus described my invention, what I claim as new, and desire to secure by Letters Patent, is—

1. The combination, of a socket for holding an incandescent electric lamp, an electric conductor in said socket, a circuit-making and breaking device, an oscillating and spring-actuated lever, a cord or chain attached to said lever and a pawl and ratchet-mechanism interposed between the lever and said circuit-making and breaking device and adapted to operate the latter, substantially as set forth.

2. The combination, of a socket provided with electrical conductors, a spindle arranged between said conductors, an oblong block on said spindle, a ratchet-wheel also arranged on said spindle, a spring-actuated lever, placed loosely on the spindle, and clutch device interposed between the lever and the spindle, so as to produce the turning of the block when moving the lever in downward direction, but without turning the spindle when the lever is returned by its spring in upward direction, substantially as set forth.

3. The combination, with a socket having electrical conductors, a rotary spindle arranged between said conductors, a block on said spindle adapted to engage or release the said conductors, a ratchet-wheel on said spindle, a check-pawl engaging said ratchet wheel, a sleeve mounted loosely on said spindle, a lever attached to said sleeve, a helical spring acting on said lever and sleeve, and a clutch-device between the sleeve and the spindle, substantially as set forth.

ISAAC GOLDKIND.

Witnesses:
PAUL GOEPEL,
CHARLES SCHROEDER.